US012693005B2

(12) United States Patent
Kaiser

(10) Patent No.: US 12,693,005 B2
(45) Date of Patent: Jul. 28, 2026

(54) LIGHTING DEVICE

(71) Applicant: Wanchen Kaiser, New York, NY (US)

(72) Inventor: Wanchen Kaiser, New York, NY (US)

( * ) Notice: Subject to any disclaimer, the term of this patent is extended or adjusted under 35 U.S.C. 154(b) by 0 days.

(21) Appl. No.: 19/065,300

(22) Filed: Feb. 27, 2025

(65) Prior Publication Data

US 2025/0277579 A1 Sep. 4, 2025

Related U.S. Application Data

(60) Provisional application No. 63/686,607, filed on Aug. 23, 2024, provisional application No. 63/682,314, filed on Aug. 12, 2024, provisional application No. 63/678,858, filed on Aug. 2, 2024, provisional application No. 63/676,418, filed on Jul. 28, 2024, provisional application No. 63/559,761, filed on Feb. 29, 2024.

(51) Int. Cl.

| | |
|---|---|
| ***F21V 21/30*** | (2006.01) |
| ***F21V 21/26*** | (2006.01) |
| ***F21Y 107/10*** | (2016.01) |
| ***F21Y 113/00*** | (2016.01) |
| ***F21Y 115/10*** | (2016.01) |

(52) U.S. Cl.

CPC .............. *F21V 21/30* (2013.01); *F21V 21/26* (2013.01); *F21Y 2107/10* (2016.08); *F21Y 2113/00* (2013.01); *F21Y 2115/10* (2016.08)

(58) Field of Classification Search

CPC .......... F21S 6/005; F21S 6/002; F21V 21/26; F21V 21/30; F21V 14/02; F21V 1/06; F21V 1/08; F21Y 2107/10

See application file for complete search history.

(56) References Cited

U.S. PATENT DOCUMENTS

| | | | | |
|---|---|---|---|---|
| 6,585,395 B2 * | 7/2003 | Luk | F21V 14/02 | 362/372 |
| 2009/0303718 A1 * | 12/2009 | Zheng | F21V 29/77 | 362/249.02 |
| 2011/0019423 A1 * | 1/2011 | Ko | F21V 1/08 | 362/287 |
| 2019/0323698 A1 * | 10/2019 | Nölle | F21V 21/30 | |
| 2022/0186914 A1 * | 6/2022 | Frankl | F21V 21/30 | |

* cited by examiner

*Primary Examiner* — William N Harris

(74) *Attorney, Agent, or Firm* — Steven N. Fox, Esq.

(57) ABSTRACT

A lighting device for use by a person comprising an inner bracket and an outer bracket. The device further comprises a first light rotatably engaged the inner bracket and the outer bracket. The device further comprises a second light rotatably engaged with the inner bracket and the outer bracket. The second light is disposed below the first light. The device further comprises a third light engaged with the inner bracket and the outer bracket. The third light is disposed below the second light.

19 Claims, 7 Drawing Sheets

LIGHTING DEVICE

CROSS-REFERENCE TO RELATED APPLICATIONS

This application claims priority to and the benefit of U.S. Provisional Application Ser. No. 63/559,761 filed on Feb. 29, 2024; U.S. Provisional Application Ser. No. 63/676,418 filed on Jul. 28, 2024; U.S. Provisional Application Ser. No. 63/678,858 filed on Aug. 2, 2024; U.S. Provisional Application Ser. No. 63/682,314 filed on Aug. 12, 2024; and U.S. Provisional Application Ser. No. 63/686,607 filed on Aug. 23, 2024.

BACKGROUND OF THE INVENTION

Light therapy employing light emitting diodes have recently been used to trat facial conditions such as acne and other conditions. There is a continuing need for ergonomic devices to deliver such light therapy.

SUMMARY OF THE INVENTION

A light device for use by a person comprising an inner bracket and an outer bracket. The device further comprises a first light rotatably engaged the inner bracket and the outer bracket. The device further comprises a second light rotatably engaged with the inner bracket and the outer bracket. The second light is disposed below the first light. The device further comprises a third light engaged with the inner bracket and the outer bracket. The third light is disposed below the second light. The first light, second light, and third light each comprise a plurality of light sources that in the preferred embodiment are light emitting diodes having different types of colors to allow for different types of light treatment therapy.

BRIEF DESCRIPTION OF THE DRAWINGS

The following description of the invention will be more fully understood with reference to the accompanying drawings in which.

DESCRIPTION OF THE INVENTION

Figure 1:
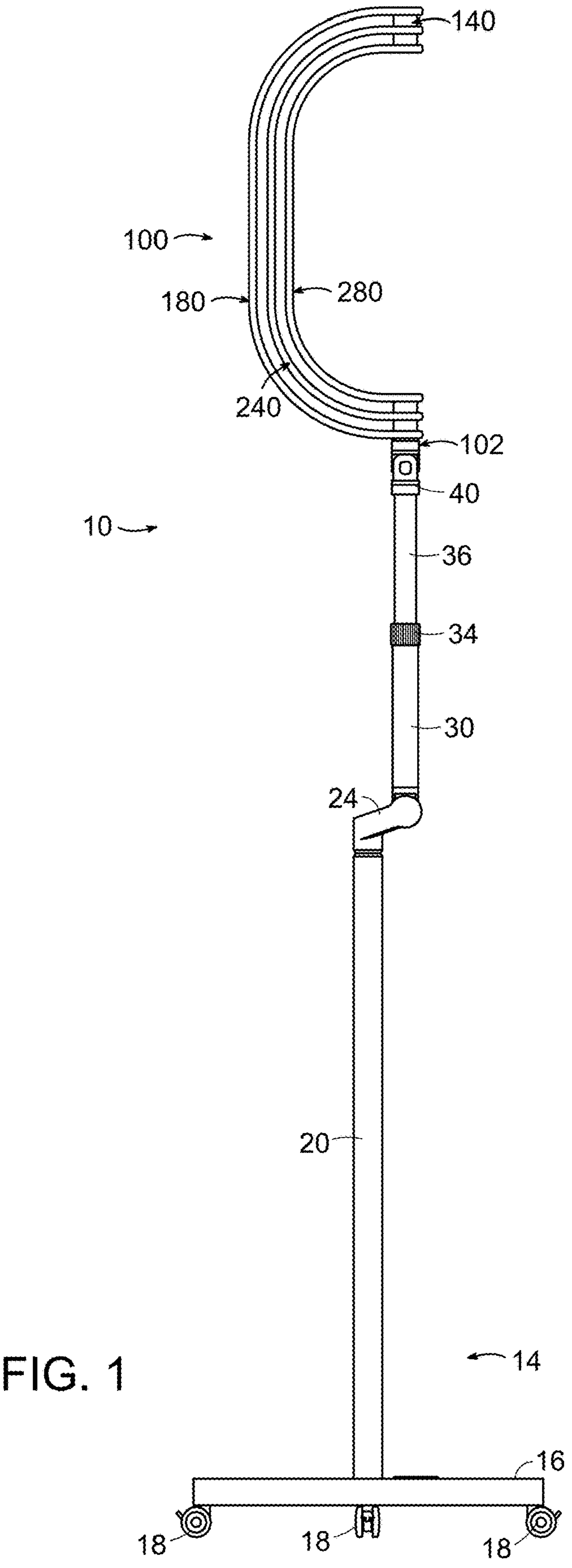
FIG. 1 is a perspective view of a lighting device according to the present invention mounted to a stand in a first position.
Figure 2:
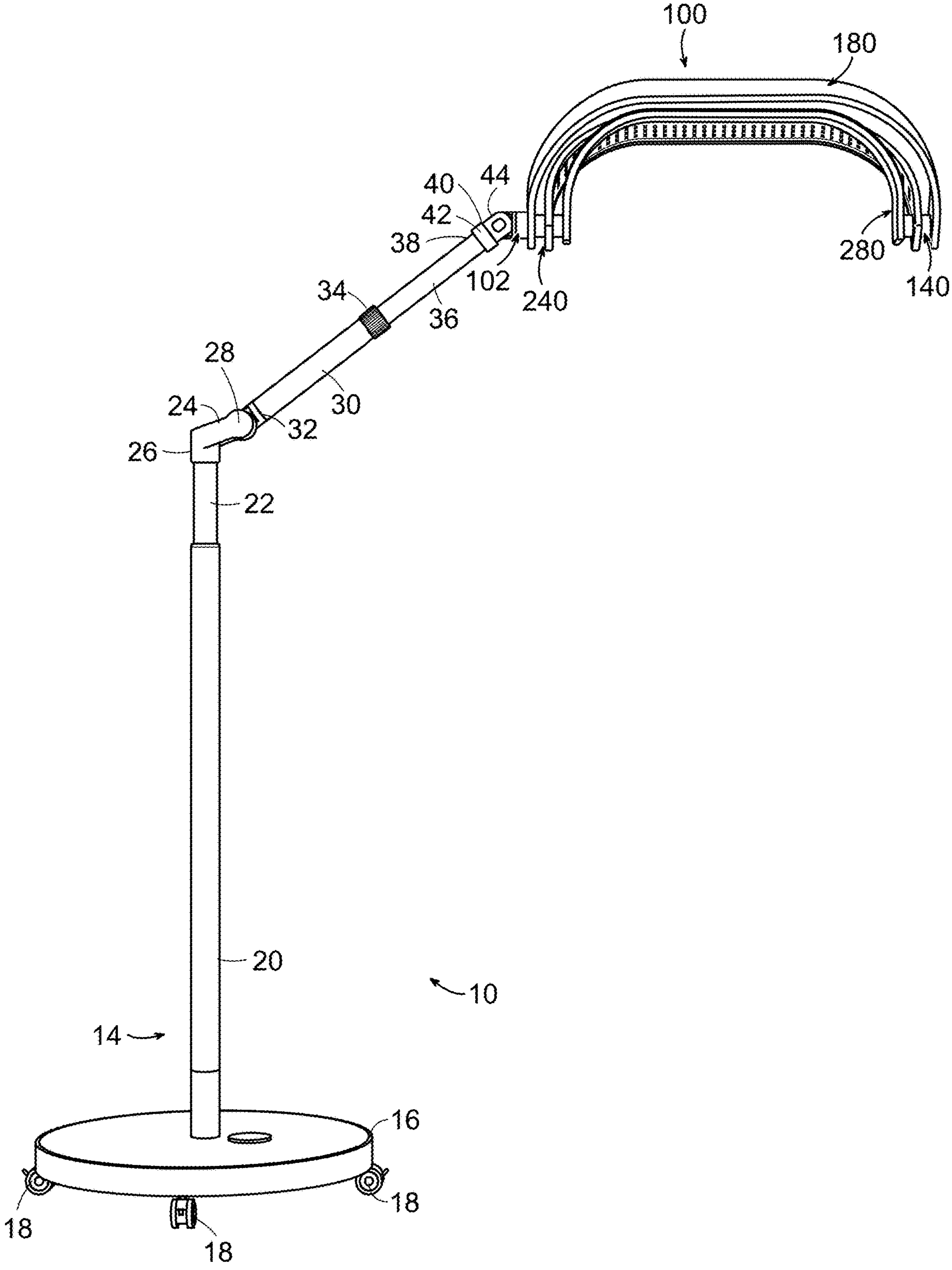
FIG. 2 is a perspective view of the lighting device mounted to the stand in a second position.

Referring to FIGS. 1-2, a lighting device 10 according to the present invention is shown for use by a person or practitioner such as a cosmetologist to provide a plurality of LED lights for a variety of purposes and applications during cosmetic procedures such as LED light therapy with different colors for treating various facial and/or other skin ailments. Lighting device 10 generally comprises a light unit 100 rotatably engaged with a stand 14.

With continued reference to FIGS. 1 and 2, stand 14 comprises a base 16 and a plurality of wheels 18 mounted to the bottom of base 16 to allow lighting device 10 to be easily moved. Stand 14 further comprises a tubular pole 20 attached to base 16 by conventional means and a tubular pole 22 telescopically disposed and moveable with tubular pole 20 by conventional means. Stand 14 further comprises a bracket 24 comprising a lower end 26 engaged with tubular pole 22 and an upper end 28. Stand 14 further comprises a tubular pole 30 comprising a lower end 32 rotatably engaged with upper end 28 of bracket 24. Tubular pole 30 further comprises a collar 34 for locking a tubular pole 36 in a position selected by the person. Tubular pole 36 is telescopically engaged within tubular pole 30 and can be locked in place by tightening collar 34. Tubular pole 36 further comprises an upper end 38 that is securely engaged with a mounting bracket 40. Mounting bracket 40 comprises a lower end 42 engaged with upper end 38 of tubular pole 36 and an upper end 44 that is rotatably engaged with light unit 100. Stand 14 and all of its components are well known in the art and widely available.

With continued reference to FIGS. 1 and 2, light unit 100 comprises an inner bracket 102 and an outer bracket 140. Light unit 100 further comprises a first light 180 rotatably engaged with inner bracket 102 and outer bracket 140. Light unit 100 further comprises a second light 240 rotatably engaged with inner bracket 102 and outer bracket 140. Light unit 100 further comprises a third light 280 engaged with inner bracket 102 and outer bracket 140. Second light 240 is disposed below first light 180, and third light 280 is disposed below second light 240. First light 180 and second light 240 can be rotated outward from third light 280 to form a partial or full dome shape as shown in FIG. 2. First light 180, second light 240, and third light 280 can be placed in many positions such as a vertical overlapping position as shown in FIG. 1. First light 180 and second light 240 can be rotated to many different positions other than as shown in FIGS. 1 and 2.

Figure 3:
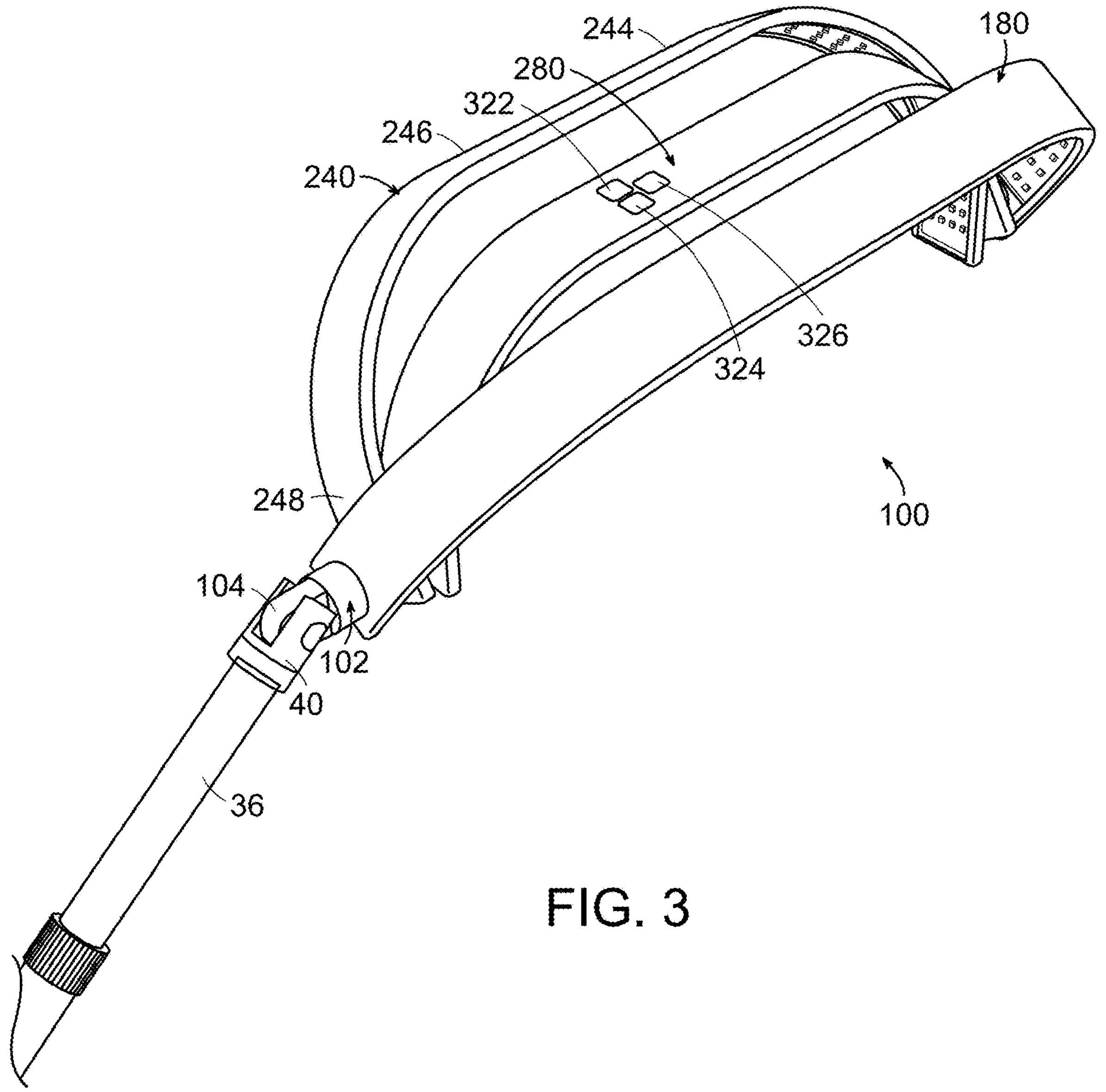
FIG. 3 is a top perspective view of a light unit of the lighting device in a position selected by a person shown comprising a first light and a second light rotatably engaged with an inner bracket and an outer bracket of the light unit, and a third light engaged with the inner bracket and outer bracket of the light unit.
Figure 4:
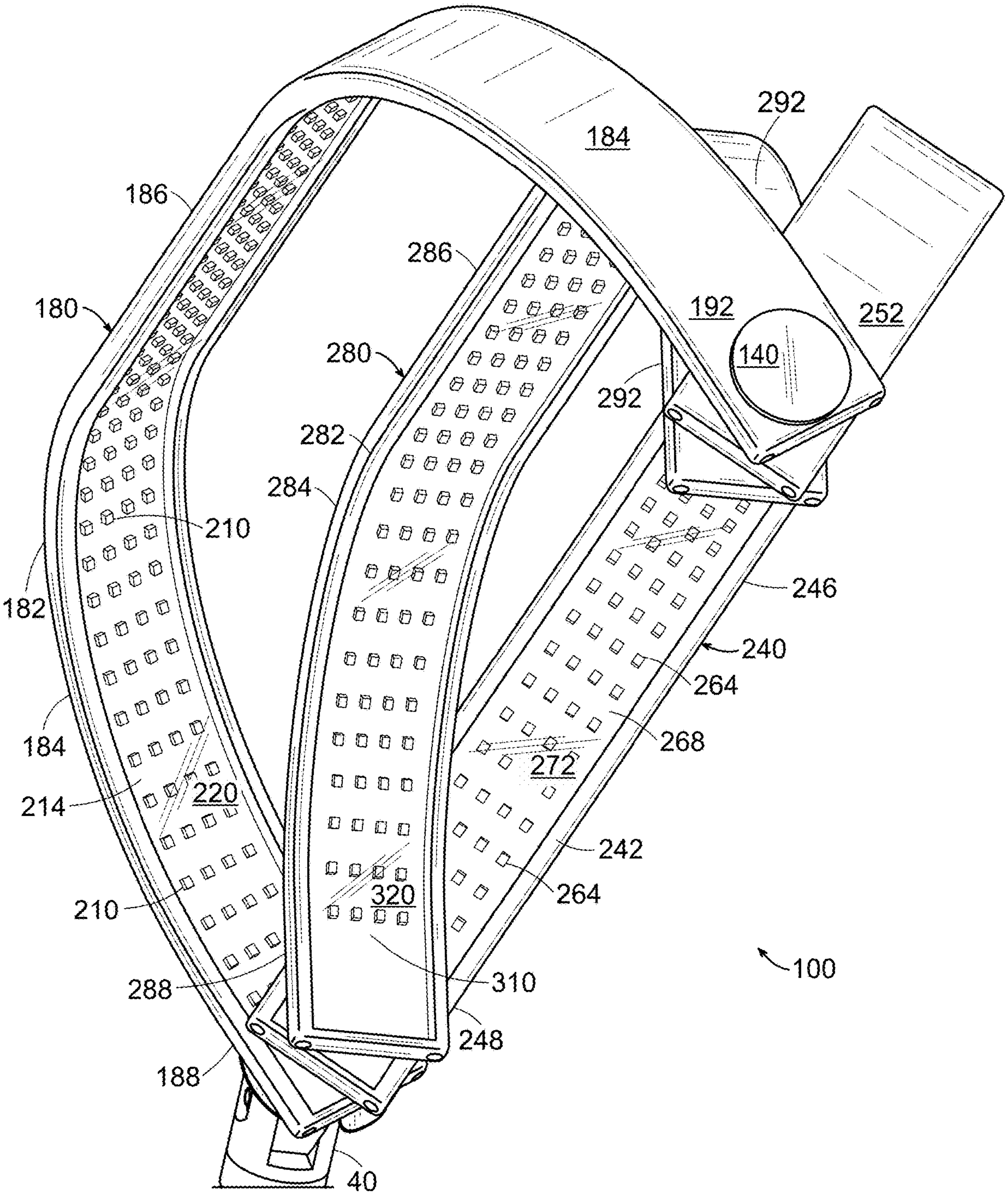
FIG. 4 is a bottom perspective view of the first light and second light rotatably engaged with the inner bracket and outer bracket of the light unit and the third light engaged with the inner bracket and outer bracket of the light unit.

Referring to FIGS. 3 and 4, first light 180 comprises a housing 182 comprising a rear wall 184 comprising a median portion 186, a left end 188 rotatably engaged with inner bracket 102, and a right end 192 rotatably engaged with outer bracket 140. Left end 188 is curved downward and inward from median portion 186. Right end 192 is curved downward and inward from median portion 186 towards left end 188. Housing 182 further comprises a circular shaped opening 190 extending completely through left end 188 to allow left end 188 of housing 182 to rotatably engage with inner bracket 102. Housing 182 further comprises a circular shaped opening 194 extending completely through right end 192 to allow right end 192 of housing 182 to rotatably engage with outer bracket 140. First light 180 further comprises a plurality of light sources 210 disposed within housing 182 substantially extending from left end 188 to right end 192. In the embodiment shown, light sources 210 are light emitting diodes. First light 180 further comprises a printed circuit board 214 disposed within housing 182 substantially extending from left end 188 to right end 192 for mounting and electrically connecting light sources 210 by conventional means. First light 180 further comprises a transparent cover 220 attached to housing 182 by conventional means such as grooves disposed in the side walls of housing 182. Light sources 210 are disposed below transparent cover 220 such that light from light sources 210 pass thru transparent cover 220. Transparent cover 220 can take other forms such as frosted.

With continued reference to FIGS. 3 and 4, second light 240 comprises a housing 242 comprising a rear wall 244 comprising a median portion 246, a left end 248 rotatably engaged with inner bracket 102 and a right end 252 rotatably engaged with outer bracket 140. Left end portion 248 is curved downward and inward from median portion 246. Right end portion 252 is curved downward and inward from median portion 246 towards left end portion 248. Housing 182 further comprises a circular shaped opening 250 extending completely through left end 248 to allow left end 248 of housing 242 to rotatably engage with inner bracket 102. Housing 182 further comprises a circular shaped opening 254 extending completely through right end 252 to allow right end 252 of housing 182 to rotatably engage with outer bracket 140. Second light 240 further comprises a plurality of light sources 264 disposed within housing 242 substantially extending from left end 248 to right end 252. In the embodiment shown, light sources 264 are light emitting diodes. Second curved light 240 further comprises a printed circuit board 268 disposed within housing 242 substantially extending from left end 248 to right end 252 for mounting and electrically connecting light sources 264 by conventional means. Second light 240 further comprises a transparent cover 272 attached to housing 242 by conventional means such as grooves disposed in the side walls of housing 242. Light sources 264 are disposed below transparent cover 272 such that light from light sources 264 passes thru transparent cover 272. Transparent cover 272 may take other forms such as frosted.

With continued reference to FIGS. 3 and 4, third light 280 comprises a housing 282 comprising a rear wall 284 comprising median portion 286, a left end 288 rotatably engaged with inner bracket 102 and a right end 292 rotatably engaged with outer bracket 140. Left end portion 288 of rear wall 284 is secured or fixed to inner bracket 102 by a plurality of screws (not shown). In the embodiment shown, third light 280 does not rotate relative to inner bracket 102. In other embodiments, third curved light 280 may rotate relative to inner bracket 102. Left end 288 is curved downward and inward from median portion 286. Right end 292 is curved downward and inward from median portion 286 towards left end portion 288. Third light 280 further comprises a plurality of light sources 300 disposed within housing 282 substantially extending from left end 288 to right end 292. In the embodiment shown, light sources 300 are light emitting diodes. Third light 280 further comprises a printed circuit board 310 disposed within housing 282 substantially extending from left end 288 to right end 292 for mounting and electrically connecting light sources 300 by conventional means. Third light 280 further comprises a transparent cover 320 attached to housing 242 by conventional means such as grooves disposed in the side walls of housing 282. Light sources 300 are disposed below transparent cover 320 such that light from light sources 300 passes thru transparent cover 320. Transparent cover 320 may take other forms such as frosted. As shown in FIG. 3, as will be described more fully herein, third light 280 further comprises a series of buttons 322, 324, and 326 disposed on median portion 286 of rear wall 284 of housing 282 that when depressed control the on/off state, color, and/or brightness of light sources 210 of first light 180, light sources 264 of second light 240, and/or light sources 300 of third light 280.

Figure 5:
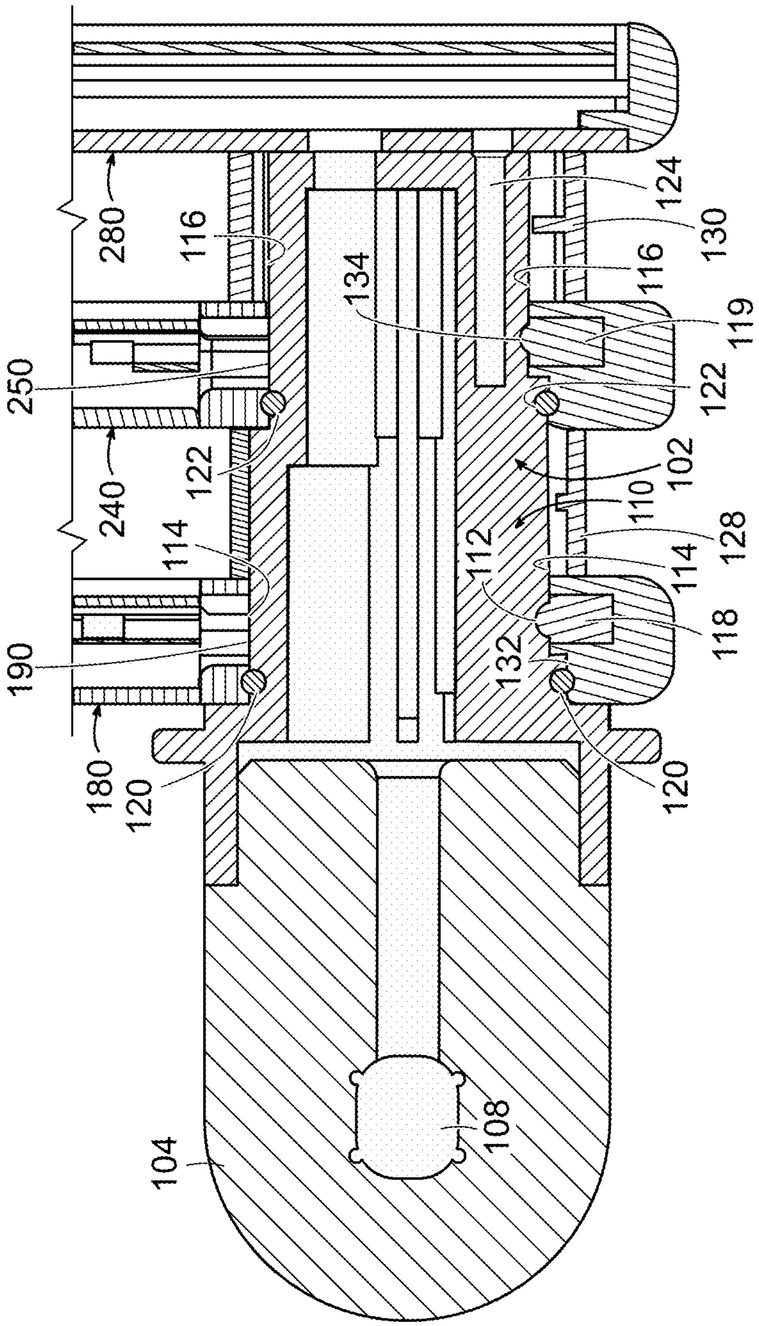
FIG. 5 is a cross-section view of the first light and second light rotatably engaged with the inner bracket of the light unit and the third light engaged with the inner bracket of the light unit.

Referring to FIG. 5, a cross-section view shows first light 180 and second light 240 rotatably engaged with inner bracket 102 and third light 280 engaged with inner bracket 102. Inner bracket 102 comprises a left part 104 adapted to rotatably engage with bracket 40 of stand 12. Left part 104 comprises a channel 106 for wiring and an opening 108 for rotatably mounting with bracket 40. Inner bracket 102 further comprises a right part 110 adapted to rotatably receive first light 180 and second light 240 and engage with third light 280. Right part 110 comprises an outermost annular step or surface 112, a middle annular step or surface 114, and an innermost annular step or surface 116. Opening 190 of first light 180 is disposed about outermost annular surface 116 and middle annular surface 114 of right part 110. A spacer 128 is provided adjacent first light 180. Opening 250 of second light 240 is disposed about middle annular surface 114 and innermost annular surface 116 of right part 110. Right part 140 further comprises a hole 124 so that third light 280 can be screwed to right part 110 by a screw (not shown). Although one (1) hole is shown, three (3) holes and screws are employed so that third light 280 is fixed to right part 152. A spacer 130 is provided adjacent second light 240 and third light 280. An oaring 120 is disposed between outermost annular surface 112 of right part 110 and left end 196 of housing 182 of first light 180 to reduce friction during rotation. An O-rings 122 is disposed between middle annular surface 114 of right part 110 and left end 246 of housing 242 of second light 240 to reduce friction during rotation. A retractable pin 118 is provided in left end 188 of housing 182 of first curved light 180 that removably engages and/or locks with an indentation 132 of right part 110 of inner bracket 102 to secure first light 180 in a selected position. Multiple indentations may be provided so first light 180 can be rotated to different positions. A retractable pin 119 is provided in left end 248 of housing 242 of second light 240 that removably engages and/or locks with an indentation 134 of inner bracket 102 to secure second light 240 is a selected position. Multiple indentations may be provided so second light 180 can be rotated to different positions. Pin 118 and pin 119 are well known in the art and widely available.

Figure 6:
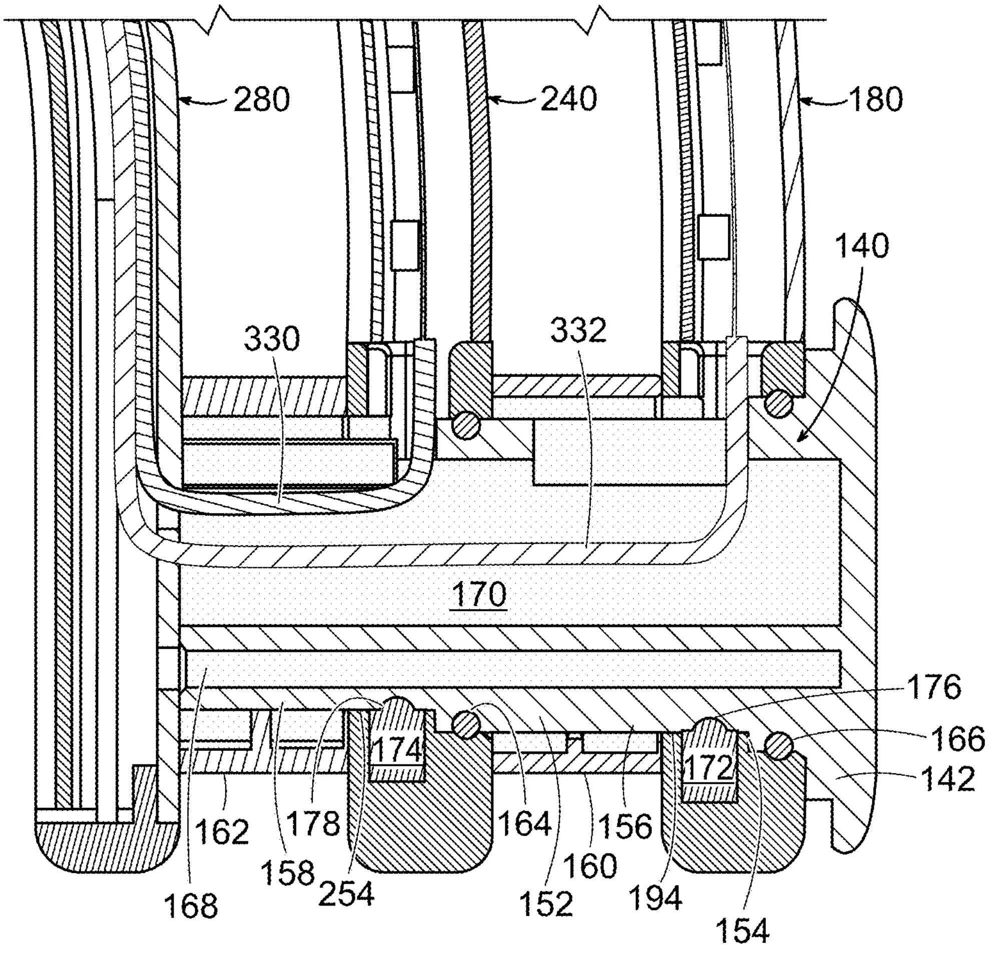
FIG. 6 is a cross-section view of the first light and the second light rotatably engaged with the outer bracket of the light unit and the third light engaged with the outer bracket of the light unit.

Referring to FIG. 6, a cross-section view shows first light 180 and second light 240 rotatably engaged with outer bracket 140 and third light 280 engaged with outer bracket 140. Outer bracket 140 comprises a cap or flange 142 and a left part 152 adapted to rotatably engage with first light 180 and second light 240 and engage with third light 280. Left part 152 comprises a channel 170 for passing of wiring from third light 280 to first light 180 and second light 240. Wires 332 are provided to electrically connect an electronic circuit 400 (FIG. 4—to be described) of third light 280 with light sources 210 of first light 180. Wires 330 are provided to electrically connect electronic circuit 400 of third light 280 with light sources 264 of second light 240. Left part 152 comprises an outermost annular step or surface 154, a middle annular step or surface 156, and an innermost annular step or surface 158. Opening 194 of first light 180 is inserted and disposed about outmost annular surface 154 and middle annular surface 156 of left part 152. A spacer 160 is provided adjacent first light 180. Opening 254 of second light 240 is inserted and disposed about middle annular surface 156 and innermost annular surface 158 of left part 152. Left part 152 further comprises a hole 168 so that third light 280 can be screwed to left part 152 by a screw (not shown). Although one (1) hole is shown, three (3) holes and screws are employed so that third light 280 is fixed to left part 152. A spacer 162 is provided adjacent second light 240 and third light 280. An o-ring 166 is disposed between innermost annular surface 154 of left part 152 and right end 192 of housing 182 of first light 180 to reduce friction during rotation. An o-ring 164 is disposed between middle annular surface 156 of left part 152 and right end 252 of housing 242 of second light 240 to reduce friction during rotation. A pin 172 is provided in right end 192 of housing 182 of first curved light 180 that removably engages and/or locks with an indentation 176 of left part 152 of outer bracket 140 to secure first light 180 is a selected position. Multiple indentations may be provided so first light 180 can be rotated to different positions. A pin 174 is provided in right end 252 of housing 242 of second light 240 that removably engages and/or locks with an indentation 178 of outer bracket 140 to secure second light 240 is a selected orientation. Multiple indentations may be provided so second light 240 can be rotated to different positions. Pins 172 and 174 are well known in the art and widely available.

Third light 280 further comprises an electronic circuit 400 (FIG. 4) connected to printed circuit board 310, or another printed circuit board, to power and control operation of light sources 210 of first light 180, light sources 264 of second light 240, and light sources 300 of third light 280 such as light color and/or temperature. Light sources 210 of first light 180, light sources 264 of second light 240, and light sources 300 of third light 280 may have the same or different color and/or temperatures depending upon the desired application and/or treatment. Electronic circuit 400 of third light 280 is electrically connected to printed circuit board 214 of first light 180 and printed circuit board 268 of second light 240 by conventional wiring as previously described. Electronic circuits comprising microcontrollers to control the color and/or temperature of a single set or multiple arrays of Light emitting diodes are well known in the art. By way of example only, an electronic circuit for controlling light emitting diodes is described in U.S. Pat. No. 9,648,217 that is hereby incorporated into this specification in its entirety.

Figure 7:
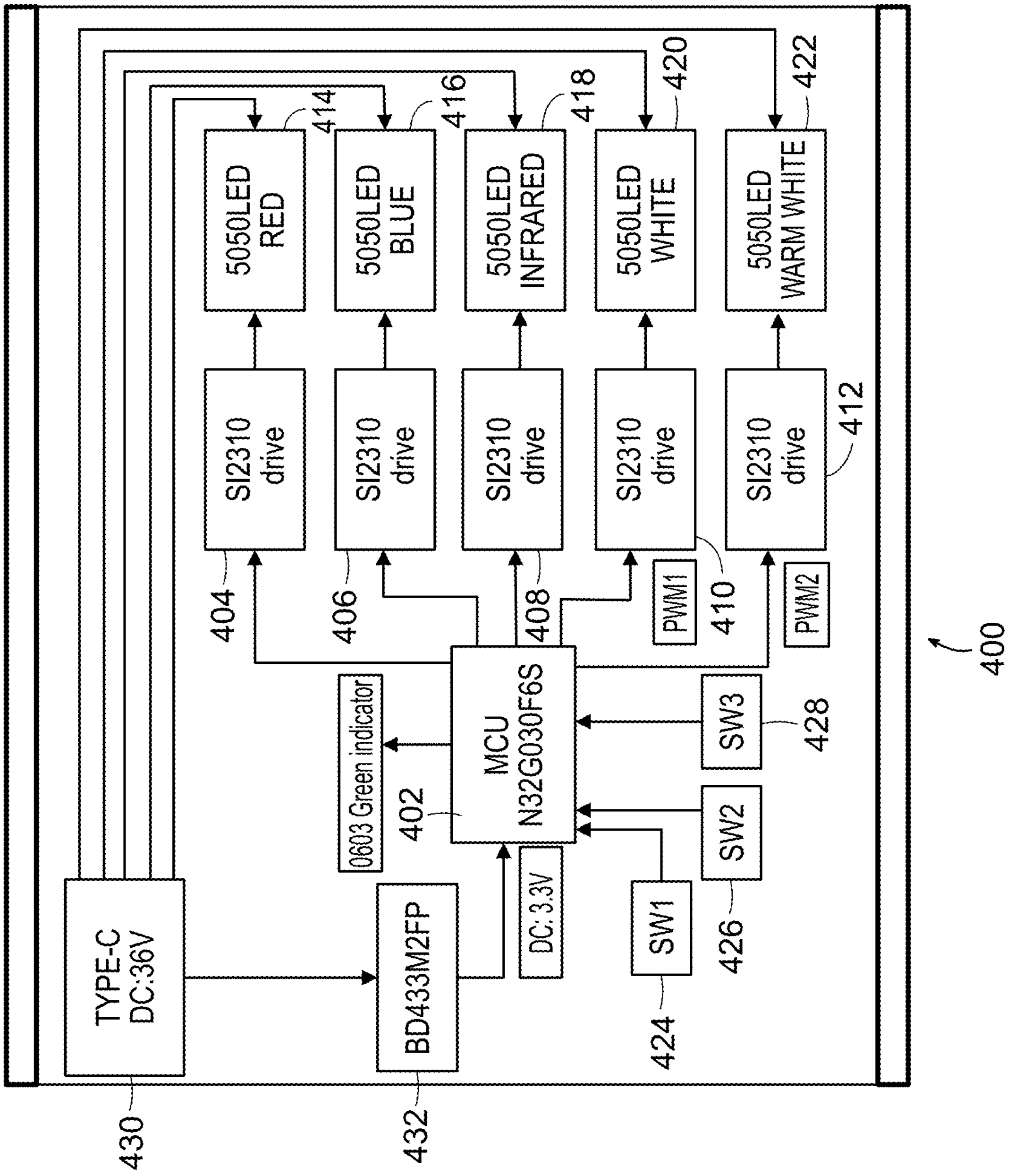
FIG. 7 is a high level block schematic of an electronic circuit for controlling the light emitting diodes of the first light, the second light, and the third light.

Referring to FIG. 7, where a preferred embodiment of electronic circuit 400 is generally shown. Electronic circuit 400 comprises a microcontroller 402 that may be programmed by well known means in the art to activate and/or control light emitting diodes 210 of first curved light 180, light emitting diodes 264 of second curved light 240 and light emitting diodes 300 of third curved light 280. Microcontroller 402 is connected to a LED driver 404 that is connected to a red LED array 414. Microcontroller 402 is connected to a LED driver 406 that is connected to a blue LED array 416. Microcontroller 402 is connected to a LED driver 408 that is connected to an infrared LED array 418. Microcontroller 402 is connected to a LED driver 410 that is connected to a white LED array 420. Microcontroller 402 is connected to a LED driver 412 that is connected to a warm white LED array 420. Each of light sources 210 of first light 180, light sources 264 of second light 240 and light sources 300 of third light 280 are made up of red LED array 414, blue LED array 416, infrared LED array 418, white LED array 420, and warm white LED array 420 and electrically connected in the same manner. Electronic circuit 400 further comprises a first switch 424 connected to microcontroller 402. First switch 424 is activated by depression of button 322 that sends a signal to microcontroller 402 to turn on and off the light sources of first light 180, second light 240, and third light 280. Electronic circuit 400 further comprises a second switch 426 connected to microcontroller 402. Second switch 426 is activated by depression of button 324 that sends a signal to microcontroller 402 to change the color mode of the light sources of first light 180, second light 240, and third light 280 in any programmed color. Electronic circuit 400 further comprises a third switch 428 connected to microcontroller 402. Third switch 428 is activated by depression of button 326 that sends a signal to microcontroller 402 to adjust the brightness of the light sources of first light 180, second light 240, and third light 280 in any predetermined level. Electronic circuit 400 further comprises a USB Type C connector 430 connected to microcontroller 402 by a voltage regulator 432 that drops the 36V input to 3.3V for microcontroller 402. Device 10 further comprises a conventional electrical cord (not shown) having a conventional AC/DC power supply (not shown) that a person can plug into a common electrical wall outlet and an USB connector that connects with USB connector 430 disposed on the bottom pole of stand 14 or many other places on stand 14 or light unit 100. Conventional wiring is provided thru the poles and brackets to connect USB connector 430 with and provide power to printed circuit board 310 of third curved light 280. Such electrical cords having a power supply are well known in the art and widely available as are USB connectors.

With reference to FIG. 3 and FIG. 7, button 326 is used to turn on and off lighting device 10. Depression and hold for two (2) seconds of button 326 causes a signal from switch 424 to be sent to microcontroller 402 of electronic control circuit 400 to turn on or off light sources 210 of first light 180, light sources 264 of second light 240, and light sources 300 of third light 280.

With continued reference to FIG. 3 and FIG. 7, button 322 is used to select the color mode of light sources 210 of first light 180, light sources 264 of second light 240, and light sources 300 of third light 280. The default mode at startup (power turned on) are the colors red and infrared by activation of light emitting diodes 414 and 418 of the light sources 210, 264, and 300. Pressing button 322 causes a signal from switch 426 to be sent to a microcontroller 402 of electronic control circuit 400 of third light 280 to activate the next color mode, namely, blue light emitting diodes 416 of light sources diodes 210 of first light 180, light sources 264 of second light 240, and light sources 300 of third light 280. Pressing button 322 again causes microcontroller 402 of electronic control circuit 400 of third light 280 to activate the next color mode, namely, "warm white light" light emitting diodes of 422 of light sources 210 of first light 180, light sources 264 of second light 240, and light sources 300 of third curved light 280. Pressing button 322 again causes microcontroller 402 of electronic control circuit 400 of third light 280 to activate the next color mode, namely, "cold white light" light emitting diodes of 420 of light sources 210 of first light 180, light sources 264 of second light 240, and light sources 300 of third light 280. Cycle thereafter.

With continued reference to FIG. 3 and FIG. 7, pressing of button 324 adjusts the brightness of light sources 210 of first light 180, light sources 264 of second light 240, and light sources 300 of third light 280. Different brightness are used from low to high cycle.

In other embodiments, any presently or futurely developed light source having therapeutic properties may be used instead of a light emitting diode light source. By way of further example only, stand 14 may be replaced with any other type of mounting means, such as table mounted means, with relocation of USB connector 430.

The foregoing description is intended primarily for purposes of illustration. This invention may be embodied in other forms or carried out in other ways without departing from the spirit or scope of the invention. Modifications and variations still falling within the spirit or scope of the invention will be readily apparent to those of skill in the art.

What is claimed:

1. A device comprising:
- an inner bracket;
- an outer bracket;
- a first light; comprising a housing; said housing comprises a rear wall comprising a median portion, a first end, and a second end; said first end of said rear wall of said housing of said first light being rotatably engaged with said inner bracket; said second end of said rear wall of said housing of said first light being rotatably engaged with said outer bracket;
- a second light rotatably engaged with said inner bracket and said outer bracket; said second light being disposed below said first light; and
- a third light engaged with said inner bracket and said outer bracket; said third light being disposed below said second light.

2. The device of claim 1, wherein said second light comprises a housing; said housing of said second light comprises a rear wall comprising a median portion, a first end, and a second end; said first end of said rear wall of said housing of said second light being rotatably engaged with said inner bracket; said second end of said rear wall of said housing of said second light being rotatably engaged with said outer bracket.

3. The device of claim 2, wherein said third light comprises a housing; said housing of said third light comprises a rear wall comprising a median portion, a first end, and a second end; said first end of said third light is engaged with said inner bracket; and second end of said third light is engaged with said outer bracket.

4. The device of claim 3, further comprising a first annular spacer disposed about said inner bracket and disposed between said first end of said first light and said first end of said second light.

5. The device of claim 4, further comprising a second annular spacer disposed about said inner bracket and disposed between said first end of said second light and said first end of said third light.

6. The device of claim 5, wherein said inner bracket comprises an outermost annular step engaged with said first light.

7. The device of claim 6, wherein said inner bracket further comprises a middle annular step engaged with said second light.

8. The device of claim 4, wherein said left end of said rear wall of said first light is curved downward and inward from said median portion of said rear wall of said first light; said right end of said rear wall of said first light is curved downward and inward from said median portion of said rear wall of said first light towards said left end of said rear wall of said first light.

9. The device of claim 8, wherein said left end of said rear wall of said second light is curved downward and inward from said median portion of said rear wall of said first light; said right end of said rear wall of said first light is curved inward from said median portion of said rear wall of said first light towards said left end of said rear wall of said first light.

10. The device of claim 1, wherein said first light comprises a plurality of light sources.

11. The device of claim 10, wherein each of said light sources of said first light is a light emitting diode.

12. The device of claim 10, wherein said second light comprises a plurality of light sources.

13. The device of claim 12, wherein each of said light sources of said second light is a light emitting diode.

14. The device of claim 12, wherein said third light comprises a plurality of light sources.

15. The device of claim 14, wherein each of said light sources of said third light is a light emitting diode.

16. The device of claim 1, further comprising a stand; said inner bracket is rotatably engaged with said stand.

17. The device of claim 3, wherein said rear wall of said housing of said first light further comprises a first opening and a second opening through said first end and said second end, respectively; of said rear wall of said housing of said first light; said opening of said first end of said rear wall of said housing of said first light being rotatably engaged with said inner bracket; said opening of said second end of said rear wall of said housing of said first light being rotatably engaged with said outer bracket.

18. The device of claim 17, wherein said rear wall of said housing of said second light further comprises a first opening and a second opening through said first end and said second end, respectively; of said rear wall of said housing of said second light; said opening of said first end of said rear wall of said housing of said second light being rotatably engaged with said inner bracket; said opening of said second end of said rear wall of said housing of said second light being rotatably engaged with said outer bracket.

19. The device of claim 3, wherein said first end of said rear wall of said housing of said third light is engaged with said inner bracket; and second end of said rear wall of said housing of said third light is engaged with said outer bracket.

* * * * *